United States Patent [19]
Yonekura et al.

[11] Patent Number: 4,656,098
[45] Date of Patent: Apr. 7, 1987

[54] LAMINATE EXCELLENT IN SURFACE GLOSS AND SURFACE HARNESS, AND PREPARATION PROCESS AND USE THEREOF

[75] Inventors: Katsuyoshi Yonekura; Akira Uchiyama; Akira Matsuda, all of Ichihara, Japan

[73] Assignee: Mitsui Petrochemical Industries, Ltd., Tokyo, Japan

[21] Appl. No.: 680,644

[22] Filed: Dec. 11, 1984

[30] Foreign Application Priority Data

Dec. 14, 1983 [JP] Japan ................................. 58-234350
Dec. 6, 1984 [JP] Japan ................................. 59-256405

[51] Int. Cl.$^4$ ............................................ B32B 27/08
[52] U.S. Cl. .................................... 428/517; 428/521; 428/31; 525/240; 525/194
[58] Field of Search ................ 525/240, 194; 428/521, 428/517, 520, 31

[56] References Cited

U.S. PATENT DOCUMENTS 4,088,714  5/1978  Huff ..................................... 525/194
4,212,787  7/1980  Matsuda et al. ..................... 525/240
4,349,592  9/1982  Nussbaum ........................... 428/122

Primary Examiner—Edith Buffalow
Attorney, Agent, or Firm—Wenderoth, Lind & Ponack

[57] ABSTRACT

Disclosed is a laminate excellent is surface gloss and scratch resistance, which comprises a thermoplastic elastomer layer composed mainly of a copolymer elastomer, at least one of which is partially crosslinked, and a layer of a partially neutralized ionomer resin or 1-olefin/(meth)acrylic acid copolymer resin having a free carboxyl group, both the layers being tightly bonded to each other.

14 Claims, No Drawings

LAMINATE EXCELLENT IN SURFACE GLOSS AND SURFACE HARNESS, AND PREPARATION PROCESS AND USE THEREOF

BACKGROUND OF THE INVENTION

1. Field of the Invention

The present invention relates to a laminate excellent in the surface gloss and surface hardness and a process for the preparation thereof. More specifically, the present invention relates to a laminate in which the merits of an olefinic thermoplastic elastomer, that is, good extrusion moldability and high heat resistance, and the merits of an ionomer or 1-olefin/(meth)acrylic acid copolymer, that is, good surface gloss and high scratch resistance, are effectively manifested while eliminating the defects of the former, that is, no gloss and poor scratch resistance, and the defects of the latter such as poor heat resistance, and in which the interlaminar peel strength between layers of the two resins is excellent, and a process for the preparation of this excellent laminate.

2. Description of the Prior Art

Since olefinic thermoplastic elastomers are excellent in the extrusion moldability, they have heretofore been used as sealing materials in vehicles such as cars and ships, cushioning materials such as bumpers and as interior and exterior materials. Moreover, olefinic thermoplastic elastomers are widely used for domestic electric appliances, sporting goods and building materials. However, since an elastomer of this type is poor in the surface gloss and scratch resistance, elimination of these defects is eagerly desired in the art. Especially in the field of production of protect molds, windshield gaskets and bumper molds of automobiles and the like, development of heat-moldable elastomeric materials excellent in the surface gloss and surface hardness is eagerly desired.

SUMMARY OF THE INVENTION

We found that a partially neutralized ionomer resin or a 1-olefin/(meth)acrylic acid copolymer resin can be laminated with an olefinic thermoplastic elastomer with a high interlaminar bonding strength and by this lamination, an excellent surface gloss and a high surface hardness can be imparted to a molded article of the olefinic thermoplastic elastomer.

It is a primary object of the present invention to provide a laminate which is excellent in the combination of extrusion moldability, elasticity, heat resistance, surface gloss, surface hardness and interlaminar bonding strength, and a process for the preparation of this laminate.

Another object of the present invention is to provide a laminate which has merits of an olefinic thermoplastic elastomer and an ionomer in combination, and a process for the preparation of this laminate.

Still another object of the present invention is to provide a thermoplastic elastomer laminate valuable as a material of a protect mold, a windshield gasket or a bumper mold of an automobile or the like, and a process for the preparation of this laminate.

In accordance with one fundamental aspect of the present invention, there is provided a laminate excellent in surface gloss and scratch resistance, which comprises a thermoplastic elastomer layer composed mainly of a composition comprising a polyolefin and an olefinic copolymer elastomer, at least one of which is partially crosslinked, and a layer of a partially neutralized ionomer resin or a 1-olefin/(meth)acrylic acid copolymer resin having a free carboxyl group, both layers being tightly bonded to each other.

In accordance with another aspect of the present invention, there is provided a process for the preparation of laminates excellent in surface gloss and scratch resistance, which comprises laminating a layer of a thermoplastic elastomer composed mainly of a composition comprising a polyolefin and an olefinic copolymer elastomer, at least one of which is partially crosslinked, with a layer of a partially neutralized ionomer resin or 1-olefin/(meth)acrylic copolymer resin having a free carboxyl group in the state where at least one of the resins of the two layers is molten, whereby both the resin layers are tightly bonded to each other.

Incidentally, by the term "(meth)acrylic acid" is meant acrylic acid and methacrylic acid.

DETAILED DESCRIPTION OF THE PREFERRED EMBODIMENTS

In the present invention, as the thermoplastic eleastomer composed mainly of a composition of a polyolefin and an olefinic copolymer elastomer, at least one of which is partially crosslinked, there can be mentioned, for example, the following compositions.

(1) A thermoplastic elastomer composition comprising (a1) a polyolefin resin such as a homopolymer of ethylene or propylene or a copolymer of ethylene or propylene with a small amount of other monomer and (c1) a partially crosslinked product of (b2) a binary copolymer elastomer of ethylene and an $\alpha$-olefin having 3 to 14 carbon atoms or a tertiary copolymer rubber of ethylene, the above $\alpha$-olefin and a non-conjugated polyene compound.

(2) A thermoplastic elastomer composition formed by dynamically heat-treating and partially crosslinking a composition of (a1) the polyolefin resin and (b1) an olefinic copolymer elastomer in the presence of an organic peroxide.

(3) A thermoplastic elastomer composition comprising (c2) a partially crosslinked product obtained by dynamically heat-treating (a1) the polyolefin resin and (b1) the olefinic copolymer elastomer in the presence of an organic peroxide and (a1) or (a2) the same or diffferent polyolefin resin.

(4) A thermoplastic elastomer composition obtained by dynamically heat-treating and partially crosslinking in the presence of an organic peroxide a composition comprising (a1) a peroxide-crosslinking type polyolefin resin such as a homopolymer of ethylene or a copolymer of ethylene and a small amount of other monomer and (a1) a peroxide-non-crosslinking type polyolefin resin such as a homopolymer of propylene or a copolymer of propylene and a small amount of other monomer.

As the olefinic copolymer rubber which is used as the starting material of the thermoplastic elastomer, there can be mentioned substantially amorphous elastomers comprising a 1-olefin as the main component, such as an ethylene-propylene copolymer rubber, an ethylene-propylene-non-conjugated diene terpolymer rubber, an ethylene-butadiene copolymer rubber, an ethylene-1-butene copolymer rubber and an ethylene-1-butene-non-conjugated terpolymer rubber, and mixtures thereof. Among these copolymer rubbers, an ethylene-propylene copolymer rubber and an ethylene-propylene-non-conjugated diene terpolymer rubber are especially preferred.

As the non-conjugated diene, there can be mentioned dicyclopentadiene, 1,4-hexadiene, cyclooctadiene, methylene-norbornene and 2-ethylidene-5-norbornene. A copolymer comprising dicyclopentadiene or 2-ethylidene-5-norbornene as a third component is especially preferred.

The Mooney viscosity ($ML_{1+4}(150°$ C.)) of the above-mentioned copolymer or terpolymer is ordinarily 10 to 200 and preferably 40 to 200, and the iodine value (unsaturation degree) is preferably up to 40.

The amounts of the respective structural units contained in the elastomer are such that in the 1-olefin portion, the ethylene unit/1-olefin unit molar ratio is from 50/50 to 90/10, preferably from 70/30 to 85/15, and in case of the terpolymer, the 1-olefin (ethylene+1-olefin) unit/non-conjugated diene unit weight ratio is from 99/1 to 80/20, preferably from 98/2 to 90/10.

In the partially crosslinked thermoplastic elastomer constituting the substrate layer of the laminate of the present invention, the mixing ratio of the polyolefin and ethylene-1-olefin copolymer elastomer constituting the partially crosslinked product is such that the polyolefin-/elastomer weight ratio is from 80/20 to 10/90, preferably from 70/30 to 20/80.

The partially crosslinked product can be prepared by incorporating an organic peroxide in an amount of 0.1 to 2 parts by weight per 100 parts by weight of the starting elastomer and performing the dynamic heat treatment.

By the "dynamic heat treatment" is meant kneading in the molten state. As the kneading means, there can be used a mixing roll, a Banbury mixer, an extruder, a kneader and a continuous mixer. Ordinarily, this treatment is conducted at 150° to 280° C. for 1 to 20 minutes.

As the organic peroxide to be used for partial crosslinking, there can be mentioned dicumyl peroxide, di-tert-butyl peroxide, 2,5-dimethyl-2,5-bis(tert-butylperoxy)hexane, 2,5-dimethyl-2,5-bis(tert-butylperoxy)-hexene-3, 1,3-bis(tert-butylperoxyisopropyl)benzene, 1,1-bis(tert-butylperoxy)-3,3,5-trimethylcyclohexame, n-butyl-4,4-bis(tert-butylperoxy)valerate, dibenzoyl peroxide and tert-butyl peroxybenzoate. Bisperoxide compounds are preferred because the smell is not strong and the scorch stability is high, and 1,3-bis(tert-butylperoxyisopropyl)benzene is especially preferred.

In this partial crosslinking treatment, if a crosslinking promoter such as p-quinone dioxime or p,p'-dibenzoylquinone dioxime or a polyfunctional compound such as divinylbenzene (DVB) or ethylene glycol dimethacrylate is used in combination with the organic peroxide, crosslinking is uniformly performed and the resulting partially crosslinked product is especially preferred as the starting material of the laminate of the present invention.

In the preparation of the thermoplastic elastomer, other organic peroxide non-crosslinking type rubber, such as polyisobutene or butyl rubber (isobutene-isoprene copolymer), a mineral oil type softener, carbon black, clay, an antioxidant and other additive may be incorporated.

As the polyolefin used in the present invention, there can be mentioned a homopolymer of a 1-olefin, a copolymer of at least two 1-olefins, a copolymer of a 1-olefin with a conjugated or non-conjugated diolefin, a copolymer of a 1-olefin with other polymerizable vinyl monomer and a modified polyolefin formed by grafting at least one polymerizable vinyl monomer to a polyolefin such as mentioned above. It is ordinarily preferred that the crystallinity of the polyolefin determined by the X-ray diffractometry be at least 50% and the melt viscosity index (MI (190° C.) or MFR (230° C.) be about 0.1 to about 50 g/10 min.

As the peroxide decomposition type polyolefin, there can be mentioned isotactic polypropylene, polybutene-1, a copolymer of propylene with up to 15 mole% of other 1-olefin, such as propylene-ethylene copolymer, a propylene-1-butene copolymer, a propylene-1-hexene copolymer or a propylene-1-butene copolymer, a propylene-1-hexene copolymer or a propylene-4-methyl-1-pentene copolymer, and blends thereof. It is preferred MFR (230° C.) of the above-mentioned polyolefin be 5 to 40.

As the peroxide crosslinking type polyolefin, there can be mentioned low-density polyethylene, medium-density polyethylene, high-density polyethylene, low-density linear polyethylene and a crystalline ethylene copolymer composed mainly of ethylene.

In the partially neutralized ionomer resin or 1-olefin/-(meth)acrylic acid copolymer resin used in the present invention, in view of the bondability to the thermoplastic elastomer and the scratch resistance, the content of the units of the carboxyl group-containing monomer is adjusted to 4 to 15 mole%, preferably 6 to 10 mole%, based on the total monomer units in the copolymer, and up to 60%, preferably up to 40%, of the carboxyl groups are bonded to an alkali metal ion and/or an ion of a metal of the Group II of the Periodic Table, preferably a calcium ion or a zinc ion. Magnesium ion is more preferable to sodium ion as a metallic ion used for forming a salt.

If a partially neutalized ionomer resin or 1-olefin/-(meth)acrylic acid copolymer resin having a water content lower than 0.015% by weight, preferably lower than 0.010% by weight, is used, the interlaminar bonding strength of the laminate can be prominently improved. This water content is ordinarily attained by heating the resin at about 80° C. for more than 4 hours.

Lamination of the thermoplastic elastomer with the partially neutralized ionomer resin or 1-olefin/(meth)acrylic acid copolymer resin can be accomplished, for example, according to the following methods.

(a) The partially neutralized ionomer resin or 1-olefin/(meth)acrylic acid copolymer resin and the thermoplastic elastomer are simultaneously extruded in multiple layers.

(b) The partially neutralized ionomer resin or 1-olefin/(meth)acrylic acid copolymer resin and the thermoplastic elastomer are injection-molded in multiple layers.

(c) The partially neutralized ionomer resin or 1-olefin/(meth)acrylic acid copolymer resin molded article is inserted into a mold, and the thermoplastic elastomer is injection-laminated on the surface.

(d) The thermoplastic elastomer molded article is inserted in a mold, and the ionomer resin or 1-olefin/-(meth)acrylic acid copolymer resin is injection-laminated on the surface.

(e) the heated thermoplastic elastomer is immersed in a powder of the ionomer resin or 1-olefin/(meth)acrylic acid copolymer resin to stick the ionomer resin or 1-olefin/(meth)acrylic acid copolymer resin to the surface of the thermoplastic elastomer, and the temperature is maintained at a level higher than the melting point of the ionomer resin or 1-olefin/(meth)acrylic acid copolymer resin to fuse the resin and form a uniform film of the resin.

Among these methods, the method (a) is ordinarily adopted.

In order to obtain a high interlaminar bonding strength, it is preferred that the weight loss of the thermoplastic elastomer at more than 150° C. under a reduced pressure of 750 mmHg or less (high vacuum side) be less than 0.4%, especially less than 0.3%, further especially less than 0.2%. The reduced pressure application time is more than 0.5 hour, preferably more than 1 hour.

The present invention will now be described in detail with reference to the following Examples. In the Examples, all of "parts" and "%" are by weight unless otherwise indicated.

REFERENTIAL EXAMPLE 1

In order to obtain a super-elastic material excellent in the rubber elasticity and profile moldability, to be used for the production of an automobile rear window frame, an olefinic thermoplastic elastomer was prepared according to the following recipe.

(1) 45 parts of an ethylene-propylene-2-ethylidene-5-norborne terpolymer elastomer (ethylene content of 78 mole%, iodine value of 15, Mooney viscosity $ML_{1+4}$(150° C.) of 90)

(2) 15 parts of crystalline polypropylene (MFR (230° C., 2.16 Kg) of 11, a density of 0.91 g/cc, a yield point stress (ASTM D-638) of 370 Kg/cm$^2$)

(3) 15 parts of an isobutene-isoprene copolymer elastomer (unsaturation degree of 0.8 mole%, Mooney viscosity $ML_{1+4}$(150° C.) of 25)

(4) 0.3 part of tetrakis(methylene(3,5-di-tert-butyl-4-hydroxyphenyl)propionate)methane as an antioxidant (5) 25 parts of a paraffinic process oil The above ingredients (1) through (5) were charged in a Banbury mixer and kneaded at 180° C. for 5 minutes in a nitrogen atmosphere, and the kneaded mixture was passed through rolls and the resulting sheet was finely cut by a sheet cutter to obtain pellets.

Then, a solution formed by dissolving and dispersing 0.4 part of 1,3-bis(tert-butylperoxyisopropyl)benzene in 0.4 part of divinylbenzene and 0.2 part of a process oil was added to the pellets, and the resulting composition was mixed by a Henschel mixer to uniformly apply the solution to the surfaces of the pellets.

The pellets were extruded at 210° C. in a nitrogen atmosphere by an extruder for a residence time of 2 minutes to effect the dynamic heat treatment of the pellets and obtain a thermoplastic elastomer.

REFERENTIAL EXAMPLE 2

In order to obtain an exterior part of an automobile such as a side mold, a medium-hard material excellent in the profile extrusion tensile strength was prepared according to the following recipe.

(1) 30 parts of an ethylene-propylenedicyclopentadiene terpolymer elastomer (ethylene unit content of 79 mole%, Mooney viscosity $ML_{1+4}$(150° C.) of 90

(2) 30 parts of the same polypropylene as used in Referential Example 1

(3) 30 parts of an ethylene-4-methyl-1-pentene copolymer (MFR (190° C., 2.16 Kg) of 18, a density of 0.92 g/ml)

(4) 10 parts of a paraffinic process oil (5) 0.3 part of the same antioxidant as used in Referential Example 1.

The above ingredients (1) through (5) were pelletized in the same manner as described in Referential Example 1, and a solution obtained by dissolving and/or dispersing 0.2 part of 1,3-bis(tert-butylperoxyisopropyl)benzene in 0.3 part of divinylbenzene and 0.5 part of a process oil was added to the pellets and the composition was mixed by a Henschel mixer to uniformly stick the solution to the pellets. The pellets were extruded at 210° C. in a nitrogen atmosphere by an extruder for a residence time of 2 minutes to effect a dynamic heat treatment and obtain a thermoplastic elastomer.

The physical properties of the thermoplastic elastomers obtained in Referential Examples 1 and 2 are shown in Table 1.

TABLE 1

| | Thermoplastic Elastomer of Referential Example 1 | Thermoplastic Elastomer of Referential Example 2 |
|---|---|---|
| MFR (230° C., 10 Kg) (g/10 min) | 10 | 10 |
| Density (g/cm$^3$) | 0.88 | 0.89 |
| Hardness (JIS-A) | 47 | 88 |
| 100% Modulus (Kgf/cm$^2$) | 12 | 50 |
| Tensile Strength (Kfg/cm$^2$) | 50 | 120 |
| Elongation (%) | 500 | 600 |
| Compression Permanent Strain (70° C. × 22 hours) (%) | 33 | 55 |
| Profile Extrusion | good | good |

In the following Examples, the surface gloss, scratch resistance (surface hardness) of the laminate were evaluated according to the following methods.

Surface Gloss

The surface gloss was measured at a light incident angle of 60° according to JIS Z-8741 (sometimes referred to as "60° gloss").

Scratch Resistance

The surface of the molded article was scratched under a pencil hardness of HB and a load of 500 g by using a scratch tester according to JIS K-5401, and the scratch resistance was evaluated according to the following standard:
5: no scratch
4: slight scratch
3: scratch was left but no scar was formed
2: shallow scar
1: deep scar

Interlaminar Bonding Strength

A test piece (20 mm (width) × 120 mm (length)) was cut out from the molded article and T-peeling of both the layers was carried out at a peeling speed of 50 mm/min.

EXAMPLE 1

A partially neutralized ionomer resin (MI (190° C.) of 5 g/10 min, carboxyl group content of 8 mole%, neutralization degree of 19%, zinc salt type) was dried at 80° C. for 4 hours to reduce the water content to 100 ppm, and the ionomer resin was melted in an extruder at 200° C. in a nitrogen atmosphere. In another extruder, the thermoplastic elastomer obtained in Referential Example 1 was melted at 230° C. in a nitrogen atmosphere. Both the melts are extruded in one mold to effect simultaneous formation of two layers.

The results of the evaluation of the obtained two-layer laminate are shown in Table 2.

From the results shown in Table 2, it is seen that the surface of the partially neutralized ionomer layer of the laminate of the present invention is substantially equivalent to the surface of an ordinary ionomer layer (Comparative Example 2) in surface gloss and scratch resistance, and the interlaminar bonding strength of the laminate of the present invention is much higher than that of the laminate of Comparative Example 2 and substantially equal to that of a laminate of layers of the thermoplastic elastomer (Comparative Example 1). Namely, since both the layers of the laminate of Comparative Example 1 are composed of the same thermoplastic elastomer, the interlaminar bonding strength should be highest, and this interlaminar bonding strength is 7 kg/cm. The interlaminar bonding strength of the laminate of the present invention is 6 kg/cm and is substantially equal to that of the laminate of Comparative Example 1.

Incidentally, in Comparative Example 3, a laminate of EVA (ethylene-vinyl acetate copolymer), generally regarded as being excellent in the interlaminar bondability, and the thermoplastic elastomer prepared in Referential Example 1 was prepared and evaluated. This laminate was equivalent to the laminate of the present invention in the surface gloss and interlaminar bonding strength, but was much inferior to the laminate of the present invention in the scratch resistance.

EXAMPLE 2

In the same manner as described in Example 1, a two-layer laminate was prepared by using the same partially neutralized ionomer resin as used in Example 1 and the thermoplastic elastomer of Referential Example 1.

The results of the evaluation of the obtained laminate are shown in Table 2. The 60° gloss of the gloss layer of the laminate and the scratch resistance were substantially the same as those of an ordinary ionomer resin, and the interlaminar bonding strength was much higher than that of the laminate of Comparative Example 2.

EXAMPLE 3

A two-layer laminate was prepared by using the same thermoplastic elastomer as used in Example 1 (thermoplastic elastomer of Referential Example 1) and an ethylene/methacrylic acid copolymer resin (MFR (190° C., 2.16 kg) of 10, carboxyl group content of 8 mole%). At first, the thermoplastic elastomer of Referential Example 1 was press-molded at 190° C. by electric heat pressing to form a sheet having a thickness of 2 mm. Then, the ethylene/methacrylic acid copolymer resin was extrusion-molded by using a T-die molding machine to obtain a sheet having a thickness of 1 mm. The obtained thermoplastic elastomer sheet was allowed to stand still in a heating oven at 150° C. for 4 hours and was heated to this temperature. The sheet was taken out from the over and the ethylene/methacrylic acid copolymer resin sheet was laminated on the heated sheet. The two-layer sheet was placed in the heating oven again and post heating was carried out for 5 minutes to obtain an intended two-layer laminate.

The results of the evaluation of the obtained laminate are shown in Table 2. The 60° gloss and scratch resistance of the gloss layer of the laminate were the same as those of an ordinary ionomer resin, and the interlaminar bonding strength was much higher than that of the laminate of Comparative Example 2.

COMPARATIVE EXAMPLE 1

A laminate having two layers, each being composed of the thermoplastic elastomer obtained in Referential Example 1, was prepared by simultaneous two layer extrusion. The results of the evaluation of the laminate are shown in Table 2.

COMPARATIVE EXAMPLE 2

An ionomer resin (MI (190° C.) of 10 g/10 min, carboxyl group content of 10 mole%, neutralization degree of 72%, sodium ion type) was melted in a nitrogen atmosphere at 200° C. in an extruder, and a two-layer laminate was obtained in the same manner as described in Example 1. The results of the evaluation of the laminate are shown in Table 2.

COMPARATIVE EXAMPLE 3

An ethylene/vinyl acetate copolymer (vinyl acetate unit content of 14% by weight, density of 0.93 g/cc, MI (190° C.) of 1.4 g/10 min) was molten in a nitrogen atmosphere at 200° C. in an extruder, and a two-layer laminate was prepared in the same manner as described in Example 1. The results of the evaluation of the laminate are shown in Table 2.

Incidentally, in Table 2, the laminate (I) is one in which the thermoplastic elastomer had been dried at 150° C. for 1 hour to reduce the water content to 100 ppm, and the laminate (II) is one obtained by melt-extrusion lamination without performing this drying treatment.

TABLE 2

|  | Constituent Layers | | 60° Gloss (%) (JIS Z-8741) | Scratch Resistance (JIS K-5401) | Laminate (I) | | Laminate (II) Interlaminar Bonding Strength (kg/cm) (T-peel) |
|---|---|---|---|---|---|---|---|
|  | Gloss Layer | Substrate Layer |  |  | Interlaminar Bonding Strength (kg/cm) (T-peel) | Peeling State |  |
| Example 1 | partially neutralized ionomer resin | thermoplastic elastomer of Referential Example 1 | 70 | 4 | 6.0 | partial material fracture | 3.3 |
| Example 2 | partially neutralized ionomer resin | thermoplastic elastomer of Referential Example 2 | 70 | 4 | 6.5 | partial material fracture | 3.3 |
| Example 3 | ethylene/ methacrylic copolymer resin | thermoplastic elastomer of Referential Example 1 | 70 | 4 | 6.2 | partial material fracture | 3.3 |

TABLE 2-continued

| | Constituent Layers | | 60° Gloss (%) (JIS Z-8741) | Scratch Resistance (JIS K-5401) | Laminate (I) | | Laminate (II) Interlaminar Bonding Strength (kg/cm) (T-peel) |
|---|---|---|---|---|---|---|---|
| | Gloss Layer | Substrate Layer | | | Interlaminar Bonding Strength (kg/cm) (T-peel) | Peeling State | |
| Comparative Example 1 | thermoplastic elastomer of Referential Example 1 | thermoplastic elastomer of Referential Example 1 | 5 | 2 | 7.0 | partial material fracture | 3.5 |
| Comparative Example 2 | ordinary ionomer resin | thermoplastic elastomer of Referential Example 1 | 70 | 4 | 0.6 | peeling | 0.6 |
| Comparative Example 3 | ethylene/vinyl acetate copolymer | thermoplastic elastomer of Referential Example 1 | 70 | 2 | 5.8 | partial material fracture | 3.5 |

We claim:

1. A laminate excellent in surface gloss and scratch resistance, which comprises a thermoplastic elastomer layer composed mainly of a composition comprising a polyolefin and an olefinic copolymer elastomer, at least one of which is partially crosslinked, and a layer of a partially neutralized ionomer resin or 1-olefin/(meth)acrylic acid copolymer resin having free carboxyl groups, both the layers being tightly bonded to each other and wherein up to 60% of the carboxyl groups of the partially neutralized ionomer resin are bonded to an alkali metal ion and/or an ion of a metal of the Group II of the Periodic Table.

2. A laminate as set forth in claim 1, wherein the polyolefin and olefinic copolymer elastomer are present at a weight ratio of from 80/20 to 10/90.

3. A laminate as set forth in claim 1, wherein the polyolefin is a peroxide decomposition type polyolefin selected from the group consisting of polypropylene and a copolymer of propylene with up to 15 mole% of another α-olefin.

4. A laminate as set forth in claim 1, wherein the polyolefin is a peroxide crosslinking type polyolefin selected from the group consisting of polyethylene and an ethylene copolymer composed mainly of ethylene.

5. A laminate as set forth in claim 1, wherein the olefinic copolymer elastomer is an elastomer having a Mooney viscosity ($ML_{1+4}(150°$ C.$)$) of 10 to 200 and an iodine value of up to 40.

6. A laminate as set forth in claim 1, wherein the olefinic copolymer elastomer is an ethylene-propylene copolymer rubber or an ethylene-propylene-non-conjugated diene terpolymer.

7. A laminate as set forth in claim 1, wherein the thermoplastic elastomer is one obtained by incorporating an organic peroxide into the composition in an amount of 0.1 to 2 parts by weight of the composition and dynamically heat-treating the mixture.

8. A laminate as set forth in claim 1, wherein the partially neutralized ionomer resin or 1-olefin/(meth)acrylic acid copolymer resin contains units of a carboxyl group-containing monomer in an amount of 4 to 15 mole% based on the total monomer units in the resin.

9. A laminate as set forth in claim 1, wherein the water content of the partially neutralized ionomer resin or 1-olefin/(meth)acrylic acid copolymer resin is up to 0.015% by weight.

10. A laminate as set forth in claim 1, wherein the weight loss of the thermoplastic elastomer by heating at more than 150° C. for more than 0.5 hours is less than 0.4%.

11. A molded article formed of a laminate as set forth in claim 1.

12. A laminate as set forth in claim 2, wherein the partially neutralized ionomer resin or 1-olefin/(meth)acrylic acid copolymer resin contains units of a carboxyl group-containing monomer in an amount of 4 to 15 mole % based on the total monomer units in the resin.

13. A laminate as set forth in claim 12, wherein the water content of the partially neutralized inomer resin or 1-olefin/(meth)acrylic acid copolymer resin is up to 0.015% by weight.

14. A laminate as set forth in claim 13, wherein the weight loss of the thermoplastic elastomer by heating at more than 150° C. for more than 0.5 hours is less than 0.4%.

* * * * *